INVENTOR
Friedrich Bernhard Kleindienst

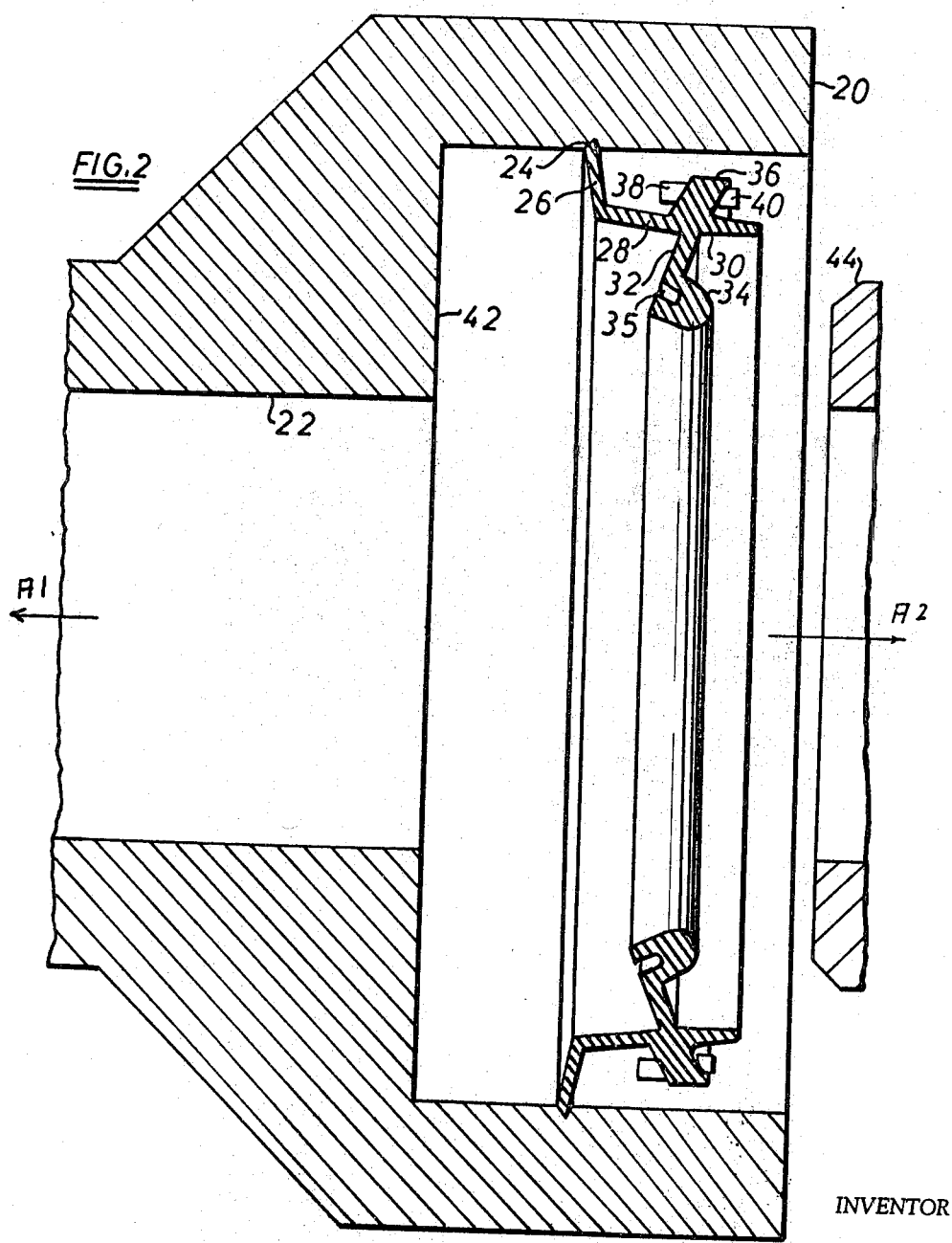

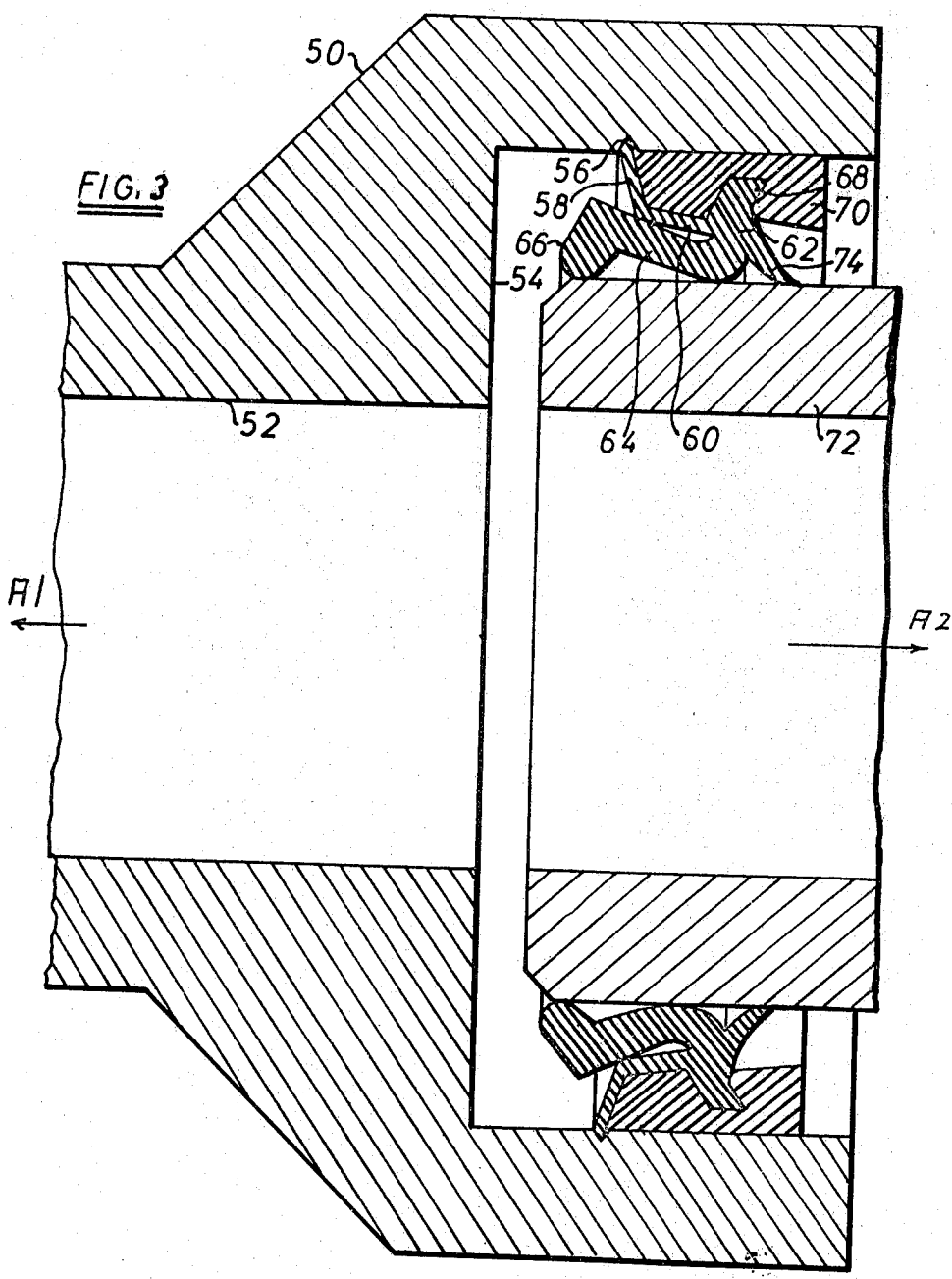

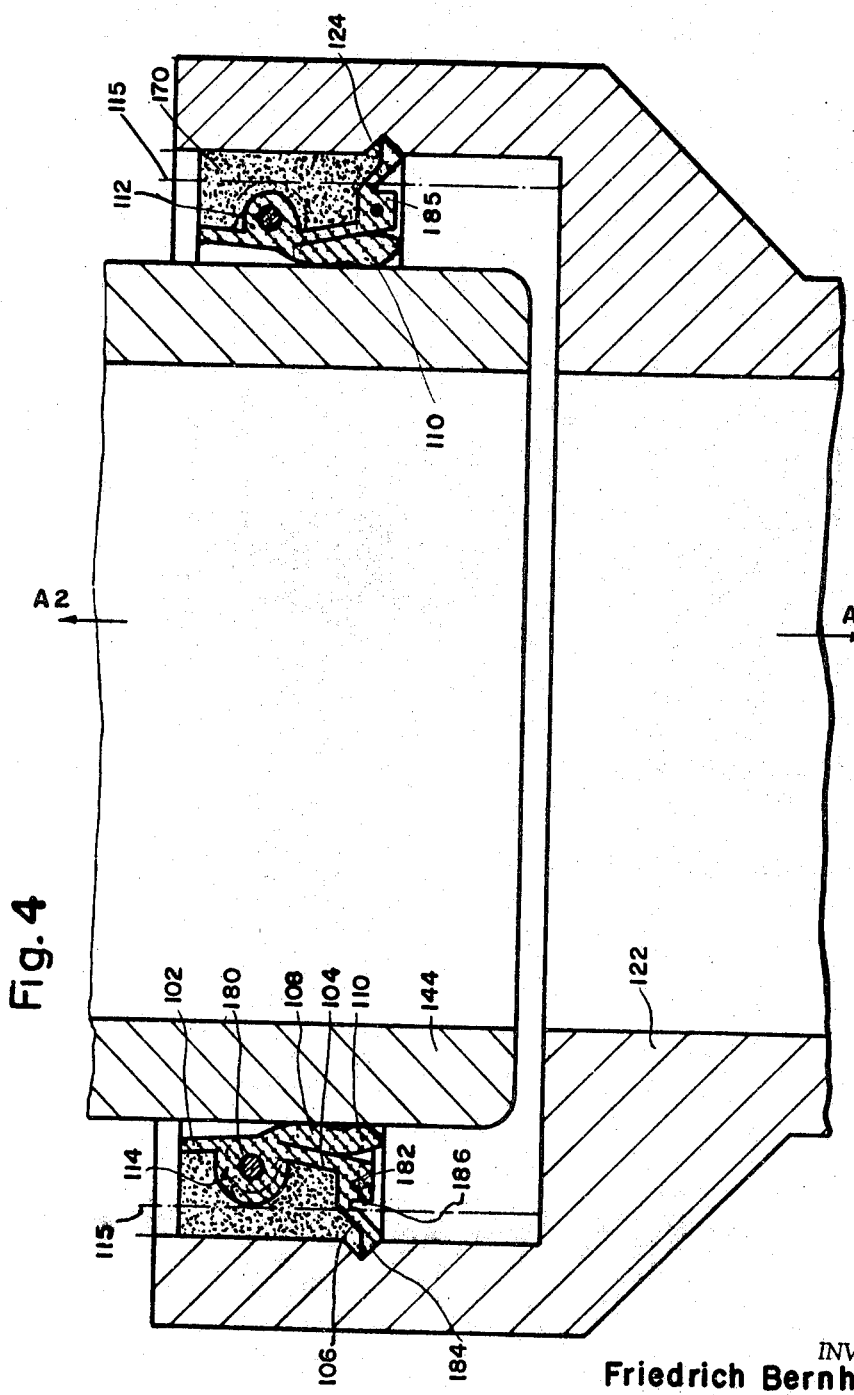

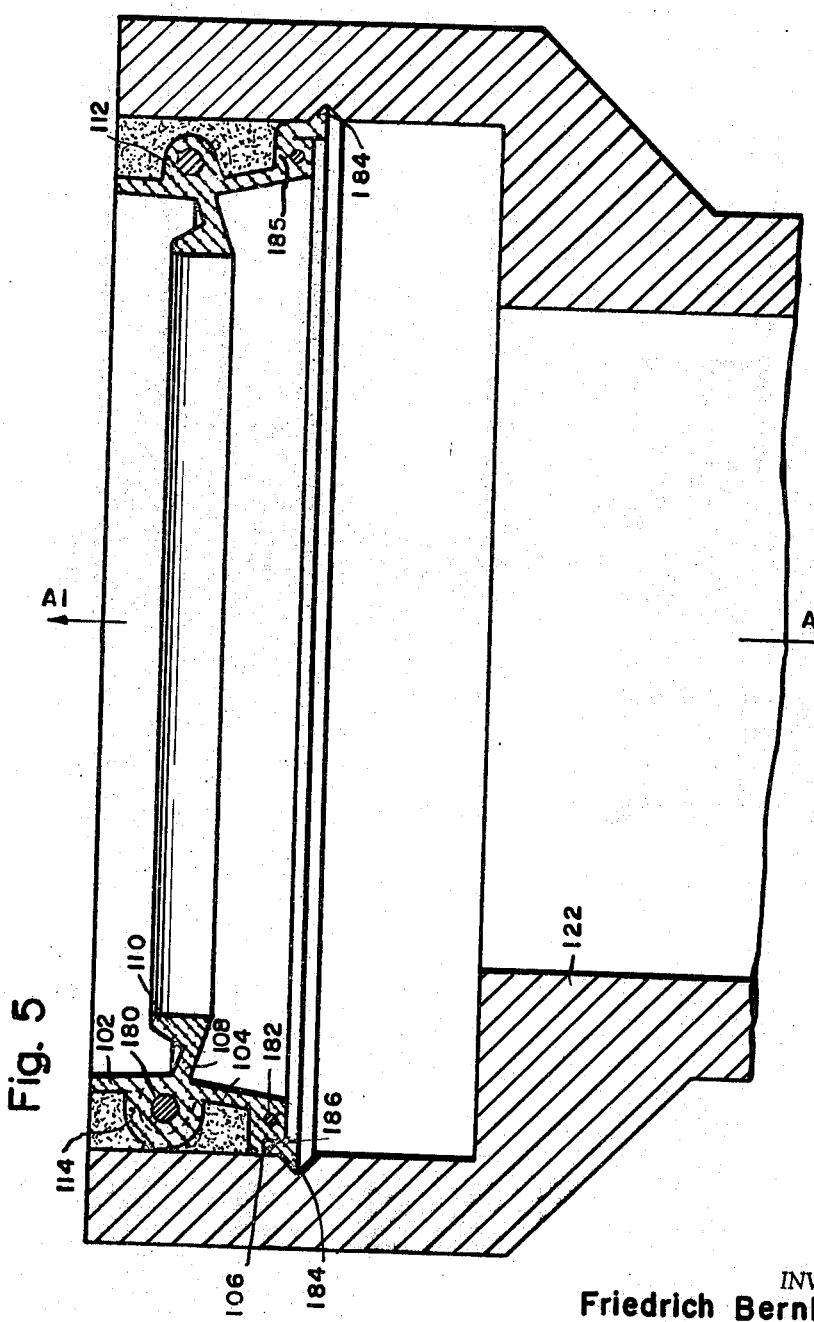

Feb. 3, 1970     F. B. KLEINDIENST     3,493,237
PACKING INSERT FOR SOCKET PIPES

Filed Dec. 2, 1967                                     6 Sheets-Sheet 6

INVENTOR
Friedrich Bernhard Kleindienst

BY *Otto John Munz*

ATTORNEY

United States Patent Office 3,493,237
Patented Feb. 3, 1970

3,493,237
PACKING INSERT FOR SOCKET PIPES
Friedrich Bernhard Kleindienst, Heidelberg, Germany, assignor to Deutsche Steinzeug- u. Kunststoffwarenfabrik
Continuation-in-part of application Ser. No. 549,346, May 11, 1966. This application Dec. 21, 1967, Ser. No. 692,560
Claims priority, application Germany, Dec. 23, 1966, D 34,787
Int. Cl. F16j 15/00, 9/16, 9/02
U.S. Cl. 277—178                    17 Claims

ABSTRACT OF THE DISCLOSURE

The packing insert has a casing of a generally cylindrical shape that flares at its bottom to a diameter greater than the internal diameter of a pipe socket, so that, when the packing insert is placed in a socket with its flared end inserted deepest, a mold is formed between the insert and the internal wall of the socket. Grouting mass can be poured into this mold to secure the insert in place. The insert has an anchoring rib that protrudes into the mold, so that the grouting mass can lock the insert in place. On the radially inward wall of the casing there protrudes a sealing lip, the purpose of which is to elastically clasp the spigot of a pipe that is inserted into the socket.

CROSS REFERENCES TO RELATED APPLICATIONS

The present application is a continuation-in-part of the inventor's copending U.S. application Ser. No. 549,346, filed May 11, 1966, for a Socket Pipe Sealing Assembly and the priorities to which that application is entitled are claimed for all subject matter common therewith.

FIELD OF THE INVENTION

The present invention relates to a packing insert of an elastic material for socket pipes, particularly ceramic sewer pipes.

DESCRIPTION OF THE PRIOR ART

It is the purpose of packing inserts of the present type to form, on the one hand, a casting mold together with the inner wall of a pipe socket, into which a grouting mass is poured, and, on the other hand, to effect a good sealing of the inserted spigot end by means of a sealing lip. The seal with respect to the spigot end will generally be the more effective, the greater the pressure upon the outer surface of the spigot end. However, on the other hand, the forces occurring therein must not be so great that the sealing media are torn apart. The invention affords a solution to this problem.

SUMMARY OF THE INVENTION

According to the invention, the packing insert includes a casing having a radially arranged sealing lip with marginal reinforcement, a supporting lip disposed radially on the outside and axially on the inside, and an anchoring rib provided in the proximity of the sealing lip and radially on the outside of the casing. The anchoring rib must not extend all the way to the socket wall or it must be spoked, in order that grouting mass be able to penetrate down to the supporting lip and fill completely around the anchoring rib. The supporting lip rests in an annular groove of the socket, which groove can also be merely a part of the customary inner roughening of the socket wall. The anchoring rib is surrounded by grouting mass poured thereover and retains the packing insert in a pipe socket. However, it is not necessary that the packing insert adhere to the grouting mass. Only a locking of the anchoring rib in the grouting mass and an adhesive connection between the grouting mass and the inner wall of the socket are required, and this connection can be produced without difficulty by means of conventional grouting masses. The marginal reinforcement of the sealing lip presses upon the outer side of the inserted spigot end. Due to the larger wall thickness of the reinforcement, it exerts a considerable force which is independent of the strength of the sealing lip. Thus, the sealing lip can be fashioned flexible and soft so that it does not tear. The entire packing insert of the invention may be made of a rubber composition having conventional sealing ability when subjected to a squeezing pressure by which it is abutted tightly against rigid surfaces. This material is illustrated in the drawings by appropriate hatching. However, in many applications it is only necessary to make the sealing lip and its root and reinforcement of such rubber.

The axial extension of the casing section carrying the supporting lip should, before the spigot end is inserted axially into the interior, at least be equal to the radial extension of the sealing lip, so that, upon insertion of the spigot end, the rear of the reinforcement is pressed against the inner wall of this casing section. In this way, the sealing forces are increased. Advantageously, the axial extension of the casing section carrying the supporting rib is even larger than the radial extension of the sealing lip, in order that the rear of the marginal reinforcement of the sealing lip contact the casing section even in case a spigot end is inserted which is at the lower limit of the diameter tolerance. If a spigot end is inserted which is at the upper limit of tolerance, then it may happen that the reinforcing ring is stretched in the direction of movement to beyond the end of the casing section, i.e., beyond the supporting lip. Although the supporting effect is partially lost thereby, the sealing pressure, in turn, is increased due to the greater stretching of the reinforcement. In order to facilitate axial sliding of the reinforcement toward the inside of the socket, it is suitable to have the casing section carrying the supporting lip flare conically toward the depths of the socket in an axial direction.

The movement of the sealing lip and the reinforcement thereof when the spigot end is inserted is facilitated when the sealing lip is axially inclined toward the depths of the socket.

During grouting, air bubbles can readily collect beneath the anchoring rib. In order to prevent this from happening, it is advantageous to incline the side of the anchoring rib facing the supporting lip from the casing toward the lip of the socket. Advantageously, the anchoring rib is provided, at least on its side facing the supporting lip, with axially projecting retaining bodies. Sufficient spacings are left between these bodies to allow air bubbles to escape. These retaining elements can be studs, for example.

It has been found by the inventor that improved sealing is obtained when a common, strong root is provided for the anchoring rib and for the sealing lip. By this construction, it can be accomplished that the sealing lip entrains, during its deformation when the spigot end is inserted, the section of the casing positioned axially toward the outside of the socket, so that this section likewise contacts the spigot end in a sealing manner (namely against external pressure). In order to achieve this without difficulties, it has been found by the inventor that it is preferable to fashion the casing section opposite the supporting lip section in the manner of a blade.

It is disadvantageous to have an elastic packing insert which deforms freely. For example, a soft packing insert can easily be pressed into sockets the diameter of which is actually too small for this packing insert. The consequence of utilizing these socket pipes which are too narrow is that the insert does not fit tightly; then, there is no assurance of a correct sealing with grouting mass and of a clean seal with respect to the spigot end to be inserted therein. Furthermore, it can happen that even after the grouting mass has been poured in, the packing insert is pulled out of socket when the spigot end is not expertly inserted. The above-mentioned disadvantages are avoided, in accordance with another advantageous embodiment of the present invention, by the provision of a bracing ring in the anchoring rib, by providing the casing with at least three studs distributed along the circumference at approximately equal angular distances and receiving the anchoring rib therein, and by providing between the sealing lip and the supporting lip an annular reinforcement or foot. By this annular reinforcement and bracing and by means of the studs serving for centering purposes, the objective is attained that the packing insert can be inserted only in sufficiently wide sockets. Sockets which are too small are eliminated because the packing insert cannot fit therein. Furthermore, the reinforced packing insert is so rigid that, upon the insertion of thick spigot ends, it cannot be pulled out of the grouting mass. Also, the reinforcement prevents deviations of the inner socket wall from the cylindrical shape, particularly an oval form of the socket, from affecting sealing provided by the sealing lip. The studs likewise serve for ensuring a minimum spacing between the anchoring rib and the inner wall of the socket, so that a sufficient quantity of the grouting mass can flow to the supporting lip.

The bracing ring of the anchoring rib is fashioned, in a particularly inexpensive and simultaneously technically especially advantageous manner, as a wire ring having a round or angular cross section; likewise, the further annular reinforcement between the sealing lip and the supporting rib is advantageously a wire ring.

When using sharp-edged anchoring ribs and retaining elements, it was discovered that cracks can occur in inexpensive grouting masses, such as mixtures of polyesters and powdered quartz. Although this can be avoided by the use of other grouting masses, such as polyurethane, for example, these are so considerably more expensive that it is more advantageous, in accordance with another advantageous embodiment of the present invention, to fashion the anchoring rib and, if desired, the studs in such a manner that they are delimited, in the axial section, radially outwards in the manner of a semicircle. The cracks otherwise occurring in the grouting mass due to a notch effect are thereby avoided.

When employing especially small sockets, it can happen that the supporting lip bends to such an extent in a direction toward the anchoring rib that a grouting-free cavity is produced between the supporting lip and the inner wall of the socket. Upon large stresses on the packing insert at right angles to the axis, this wedge-shaped hollow space can result in a breakage of the grouting mass. This breakage is avoided, in accordance with a further advantageous embodiment of the present invention, by providing the supporting lip in the proximity of its base with at least one annular groove axially open toward the depths of the socket, the radial location of this groove being approximately equal to the spacing of the outer boundary of the studs. This groove effects a weakening between the reinforced foot of the supporting lip and the supporting lip proper. This weakened portion acts as a hinge-like connection permitting the supporting lip to abut tightly sockets whose inner diameter is larger than the outer boundary of the studs. A deleterious grouting-free cavity between the inner wall of the socket and the casing is avoided at all tolerance variations in the socket diameters.

In order to improve the adhesion of the packing insert in the socket before the grouting mass is poured therein, the outer rim of the supporting lip is reinforced. A particularly favorable mounting is achieved when this reinforcement, in the axial cross section, has approximately the shape of a wedge.

Other objects and many of the attendant advantages of this invention will be readily appreciated as the same becomes better understood by reference to the following detailed description when considered in connection with the accompanying drawings in which like reference numerals designate like parts throughout the figures thereof.

BRIEF DESCRIPTION OF THE DRAWINGS

FIGURE 2 is a modified form of the insert of FIG. 1, shown completely sectioned by a cutting away of its 180° front sector and assembled in completely sectioned piping.

FIGURE 3 is another embodiment of the invention, shown in a view analogous to the view in FIG. 2.

FIGURE 4 is another embodiment of the invention, shown in a view analogous to the view of FIG. 2.

FIGURE 5 is a view of the embodiment of FIG. 4 in a very narrow socket, shown in a view analogous to the view of FIG. 2.

DESCRIPTION OF THE PREFERRED
EMBODIMENTS

In the following description, these terms are used to designated directions or relative positions: A1 is the direction into a pipe socket, as shown in FIG. 2, or the position relatively deeper in the socket; A2 is the direction out of a pipe socket, also shown in FIG. 2, or the position relatively nearer the lip of the socket; "radially outwards" is the radial direction outwards from a pipe axis or the position relatively farther from the axis; "radially inwards" is the radial direction inwards toward a pipe axis or the position relatively nearer to the axis.

Figure 1:
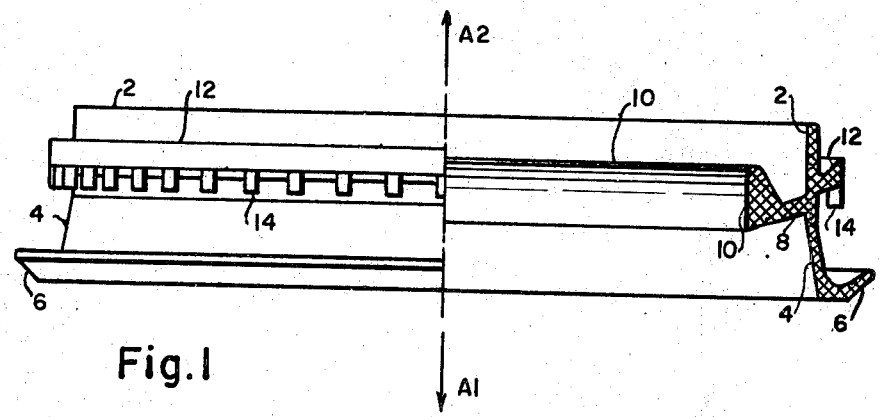
FIGURE 1 is a generally cylindrical packing insert of the invention, viewed perpendicularly to its axis and sectioned by a cutting away of its right-front 90° sector.

According to FIGURE 1, the packing insert has an A2 positioned, approximately cylindrical section 2 and an A1 positioned section 4. The A1 section 4 flares slightly conically as shown. A supporting lip 6 is integrally attached at the bottom of the A1 section. A sealing lip 8 is provided at the transition between the casing sections 2 and 4. While the supporting lip protrudes radially outwards, the sealing lip protrudes radially inwards. A reinforcement 10 is integrally attached on the radially inward side of the sealing lip. In cross section, the reinforcement 10 assumes approximately the configuration of an isosceles triangle with a rounded top. The radially inward flank of this triangle is approximately parallel to the cylindrical-conical axis. The sealing lip 8 tilts from the casing sections toward the A1 direction, as shown, and is shorter in the axial A1–A2 direction than the slightly conical casing section 4.

An anchoring rib 12 is attached to the cylindrical casing section and protrudes radially outwards therefrom. On its A1 side, this anchoring rib is provided with a large number of studs 14 which are, for example, of cylindrical configuration and extend parallel to the axis.

In FIGURE 2, the socket 20 of a socket pipe 22 contains a packing insert of the invention inserted in position. The particular insert here is modified from that of FIG. 1. The socket has an annular groove 24 on its radially inward surface. The supporting lip 26 engages therein. This supporting lip 26 is at the end of the slightly conical casing section 28. The approximately cylindrical casing section 30 is smoothly cylindrical at least on its radially inward surface. At the point of transition between the casing sections 28 and 30, a sealing lip 32 protrudes radially inwards and carries reinforcement 34. The reinforcement in this case has an approximately semicircular cross section. The sealing lip 32, in turn, is inclined toward the direction A1, as shown, and is not longer in the axial direction than the slightly conical section 28. Opposite of the sealing lip 32, the anchoring rib 36 is provided which, in the present case, carries studs 38 and 40 on both sides for anchoring purposes. As in the embodiment of FIGURE 1, the anchoring rib 36 is inclined toward the direction A2, so that when grouting mass is poured in and A2 points oppositely to the gravitational force direction, any air bubbles can escape, without difficulty, between the studs 38 axially to the outside.

In front of the opening of the socket 20 and to the right side of FIG. 2, the front face of a spigot end 44 is illustrated. It can be seen that the outer diameter of this spigot end is smaller than the inner diameter of the cylindrical section 30, but that it is substantially larger than the inner diameter of the sealing lip 32 and the reinforcement 34 thereof. Accordingly, when the spigot end is inserted, the sealing lip 32 is pressed against the slightly conical section 28, and a good seal is obtained between parts 34 and 44. If the outer diameter of the spigot end should be even larger, then it can happen that the sealing lip 32 is stretched until the reinforcement 34 slides underneath the supporting lip 26. This also results in a good seal. The reinforcement 34 protrudes in this instance from the A2 side of the sealing lip 32, but it can also be positioned on the A1 side, or it can extend from one side to the other, in both directions A1 and A2, over the radially inward rim of the sealing lip 32. While maintaining the breadth of the sealing surface with respect to the spigot end 44, the reinforcement 34 can be softened by the provision of at least one annular recess 35. This recess can also be an annular groove interrupted by reinforcing ribs.

FIGURE 3 shows an embodiment after pouring of the grouting mass and introduction of the spigot end. The socket 50 of the socket pipe 52 has a plane shoulder 54. Furthermore, it is provided with an annular channel 56 into which the supporting lip 58 engages. The supporting lip is at the end of the approximately conical casing section 60. Root 62 is thickened for extra strength and carries on its radially inward side the sealing lip 64 with reinforcement 66 and on the radially outward side the anchoring rib 68. When the spigot end 72 is inserted, the sealing lip 64 stretches to such an extent that the reinforcement 66 is positioned against the side of the supporting lip 58. On the other hand, the sealing lip 64, during its movement, has detached the approximately cylindrical section 74, which is connected with the sealing lip 64 by way of the strong root 62 and has the form of a blade, from the grouting mass 70 and has placed same against the outside of the spigot end 72, so that this casing section 74 now has a sealing effect against external pressure at this point.

The end of the spigot and the plane shoulder of the socket need not be in contact with each other for good sealing, so that there is great freedom of choice as to how far the spigot end is to be inserted. There is no danger whatsoever that the grouting mass leak between the socket and the supporting lip. Also, the grouting mass need not be resistant against the gases or liquids conducted by the pipe. Such a resistance is only required of the elastic seal.

FIGURE 4 shows a packing insert having an improved construction of the anchoring rib 112 and the supporting lip 106. The packing insert is inserted in a wide socket 122. A spigot end 144 is shown introduced therein.

The A2-positioned section 102 here flares slightly conically in the direction A2, and the A1-positioned section 104 of the casing widens to a somewhat stronger degree conically in the A1 direction. The anchoring rib 112 is disposed radially outwards of the casing, and the sealing lip 108 is likewise provided protruding from the same point radially inwards. Insertion of the spigot end 144 displaces the sealing lip and the reinforcement 110 in the A1 direction. The reinforcement can be seen more clearly in FIGURE 5.

The anchoring rib 112 anchors the packing insert securely in the grouting mass 170. In order to increase the rigidity thereof, a closed wire ring 180, butt-welded, for example, is embedded in the anchoring rib. The anchoring rib 112 carries studs 114 distributed along the circumference. The outermost circumferential line 115 (FIGURE 4) of these studs determines the inner diameter of the smallest usable socket, as shown in FIGURE 5. As shown in FIG. 4, this minimum dimension is selected in order to have assurance of a sufficiently strong wall thickness of the grouting mass 170.

FIGURE 4 also shows an improved construction of the supporting lip 106. It is provided in the proximity of its annular foot 185 with an annular groove 186 axially open to the A1 direction. The radius of this groove 186 is equal to the distance of the radially external boundary 115 of the studs 114 from the pipe axis. The weakened portion produced by the groove has the effect of a hinge, so that its wedge-shaped reinforcement 184 can readily adjust to irregularities in the diameter of groove 124 of the inner socket wall or to irregularities in its own diameter, so that a tight seal will be maintained when the grouting mass is poured.

FIGURE 5 shows how, in a narrower socket pipe, the supporting lip 106 is compressed to such an extent that the groove 186 appears only as a boundary of material between the reinforcement 184 and the foot 185. The foot 185 is shown reinforced by the wire ring 182.

By the construction of the supporting lip according to FIGURES 4 and 5, it is avoided with certainty, as can be seen from these figures, that a cavity occur between the inner wall of the socket and a radially outward, grout-opposite wall of the supporting lip. Such a cavity can occur in the embodiment of FIG. 1 due to the upwardly bent rim of the supporting lip at reference numeral 6. Forces which are effective at right angles to the axis, occurring due to a radial stress upon the spigot end, are transmitted in the arrangement of FIGURES 4 and 5 via the grouting mass 170 directly upon the socket wall, without the occurrence of shearing stresses in the grouting mass 170 which could lead to breakage thereof. Furthermore, due to the above-described construction of the supporting rib 106, wide-ranging manufacturing tolerances of the inner wall of the socket are compensated for.

Figure 6:
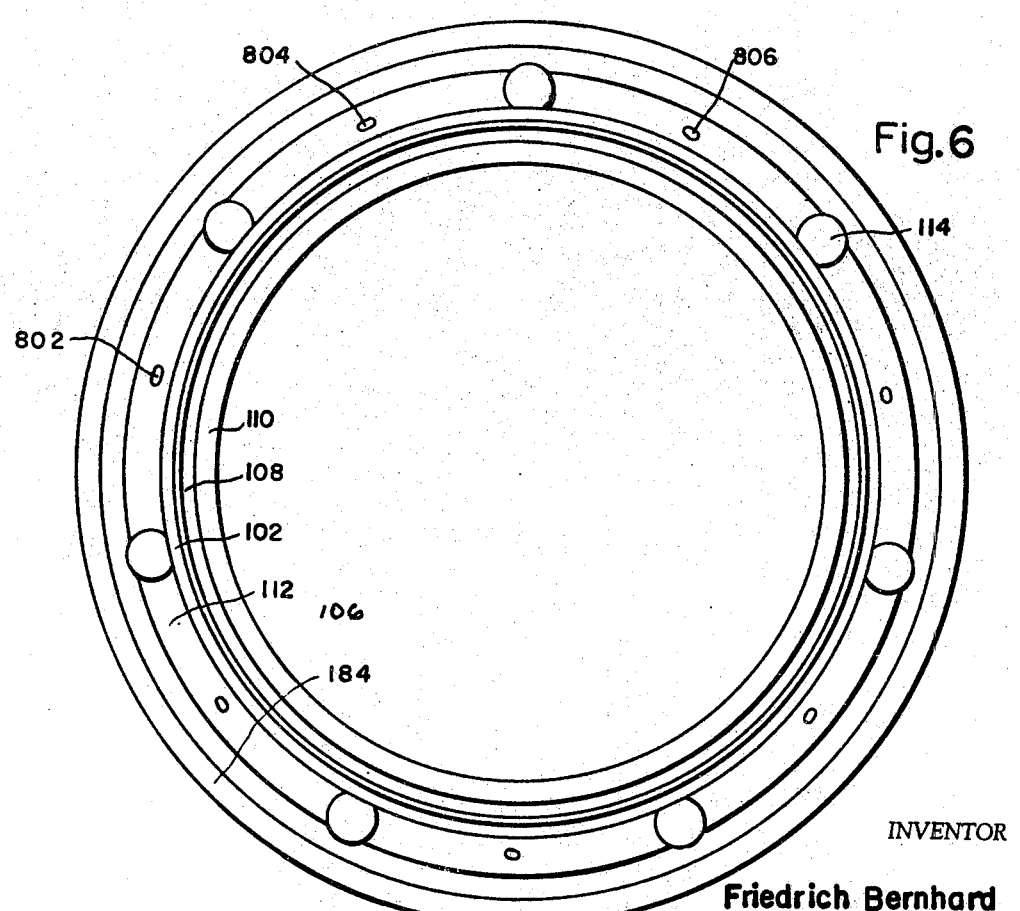
FIGURE 6 is top view of the insert of FIGURE 5 in a reduced scale.

FIGURE 6 shows a view of the packing insert of FIGURE 5 in the A1 direction and on a smaller scale. The studs 114, which show circular in this view, can clearly be seen, as well as the points 802, 804, and 806 at which the wire ring 180 illustrated in FIGURES 7 and 8 protrudes through the boundary surface of the reinforcing rib 112.

Figure 7:
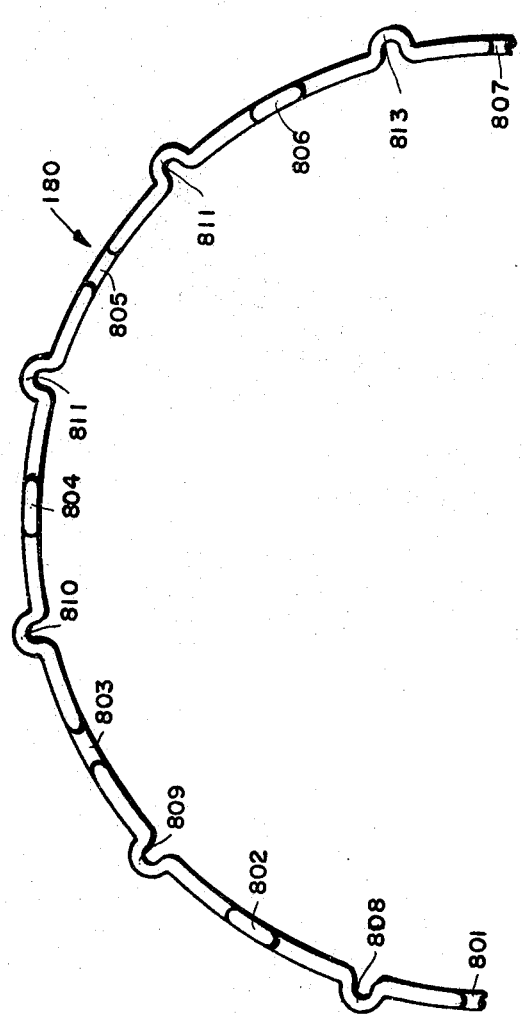
FIGURE 7 is a view of approximately one-half of the wire ring of FIGS. 4 and 5 in an axial direction toward the inside of the socket.

FIGURE 7 shows solely this wire ring 180 viewed in the A1 direction. At points 801, 803, 805, and 807, the ring is bent and protrudes axially in the A1 direction; at points 802, 804 and 806 axially in the A2 direction; and at points 808–813, radially outwards. All protrusions are to such an extent that the wire ring contacts at all points 801 to 813 the outer surface of the anchoring rib 112. The anchoring rib is semicircular in cross section as is shown in FIGS. 4 and 5. By this construction of the wire ring, a secure centering thereof during the manufacturing of the packing insert is ensured. The wire ring 182 is suitably of the same construction, so that it is likewise well centered.

Figure 8:
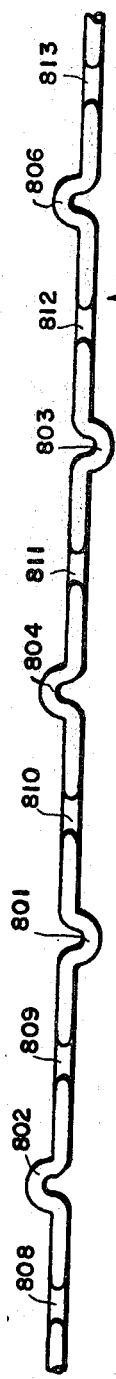
FIGURE 8 shows a developed representation of part of the object of FIGURE 7, seen radially from the inside.

FIGURE 8 shows a developed side view of FIGURE 7. The drawings are to scale in a preferred embodiment of the invention.

It is to be understood that the text of the specification and the drawings of the parent application, U.S. Ser. No. 549,346 of the inventor for a "Socket Pipe Sealing Assembly," filed on May 11, 1966, are to be considered incorporated by reference into the present disclosure. It is to be understood further that each feature of each embodiment shown, described or claimed may be substituted for equivalent portions of any other embodiment; that for purposes of brevity only, various pertinent features shown in some embodiments were not repeated in others.

The present specification describes examples of the invention for the purposes of the disclosure. It is, however, intended to cover all changes, modifications and combinations of the present invention with those disclosed in the above cited copending patent application, which do not depart from the spirit and scope of the invention as claimed.

It should be understood, of course, that the foregoing disclosure relates to only preferred embodiments of the invention and that it is intended to cover all changes, modifications and combinations of the examples of the invention herein chosen for the purposes of the disclosure, which do not constitute departures from the spirit and scope of the invention set forth in the appended claims.

I claim:

1. An integral cylindrical sealed assembly for pipes comprising a rigid pipe socket, a resilient sealing having a substantially cylindrical casing section, a rigid pipe spigot and a cast sealing cylinder, all in approximately coaxial alignment; the internal wall of said pipe socket having a diameter greater than the outer diameter of said spigot, the deepest part of said socket being its shelf lying transversely to said internal wall; said gasket having a diameter intermediate that of said internal wall and the outer diameter of said spigot; said gasket inserted in said socket and having an external sealing means extending integrally and radially outward from the gasket and facing said shelf; said external sealing means fitting sealingly in an annular recess in said internal wall, thereby forming a ring-shaped mold; said cylinder situated only within said mold and having a shape conforming to the interior surfaces of said mold; said cylinder adhering to said socket and fittingly coupled to said gasket, said gasket having an internal sealing means projecting inwardly; said spigot having its outer diameter greater than the minimum free diameter of said internal sealing means, said spigot inserted within said socket and said gasket; and means to anchor said cast cylinder comprising an anchor rib attached to the radially outward portion of the said casing section and a plurality of axially extending studs.

2. A packing insert as claimed in claim 1, including means to squeeze comprising a sealing lip (8, 32, 64, 108) integrally protruding radially inwards from said means to form a mold and a reinforcement (10, 34, 66, 110) integrally attached to said sealing lip on its radially inward side.

3. A packing insert as claimed in claim 2, including means to squeeze comprising a sealing lip (8, 32, 64) integrally protruding radially inwards from said casing and a reinforcement (10, 34, 66) integrally attached to said sealing lip on its radially inward side; the axial extension of the casing (4, 28, 60) between the supporting lip (6, 26, 58) and the point of connection of the sealing lip being at least equal to the radially inward protrusion of the sealing lip and reinforcement.

4. Packing insert as claimed in claim 2, including means to squeeze comprising a sealing lip (8, 32, 64) integrally protruding radially inwards from said casing; the casing section (4, 28, 60) flaring conically in the A1 direction between the points of connection of the sealing lip and the supporting lip.

5. A packing insert as claimed in claim 2, said means to anchor comprising an anchoring rib (12, 36, 68, 112) integrally protruding radially outwards from said means to form a mold in the proximity of said sealing lip; the anchoring rib (68) and the sealing lip (64) having a common root (62).

6. A packing insert as claimed in claim 5, said means to form a mold comprising a casing (74, 60) having radial dimensions less than the inner radial dimensions of the socket for which it is intended and extending between an A1 side and an A2 side; the casing having on the A2 side of the root (62) the shape of a blade (74).

7. A packing insert as claimed in claim 1, said means to form a mold comprising a casing (102, 104) having radial dimensions less than the inner radial dimensions of the socket for which it is intended and extending between an A1 side and an A2 side and a supporting lip (106) integrally protruding radially outwards from the A1 side of said casing; said means to squeeze comprising a sealing lip (108) integrally protruding radially inwards from said casing; further comprising an anchoring rib (112), said casing (102, 104) having at least three studs (114) distributed at approximately equal angular distances along its circumference and receiving the anchoring rib (112) therein.

8. A packing insert as claimed in claim 7, comprising a reinforcing ring (180) provided in the anchoring rib (112).

9. A packing insert as claimed in claim 8, wherein the reinforcing ring of the anchoring rib (112) is a wire ring (180).

10. A packing insert as claimed in claim 7, said casing (102, 104) having an annular reinforcement (185) between the point of connection of said sealing lip (108) and said supporting lip (106).

11. A packing insert as claimed in claim 10, further comprising a wire ring (182) positioned in the annular reinforcement (185).

12. A packing insert as claimed in claim 7, wherein the anchoring rib (112) and the studs (114) have a semicircular cross section.

13. A packing insert as claimed in claim 10 wherein the supporting lip (106) flares conically in the A1 direction from the reinforcement (185).

14. A packing insert as claimed in claim 13, wherein the supporting lip (106) is provided, in the proximity of the reinforcement (185) with at least one annular groove (186) axially open in the A1 direction, the radius of this groove being approximately equal to the distance of the outer boundary (115) of the studs (114) from the axis of the casing.

15. A packing insert as claimed in claim 13, wherein the outer margin of the supporting lip (106) is formed by a reinforcement (184).

16. A packing insert as claimed in claim 15, characterized in that the reinforcement (184), in axial cross section, has approximately the shape of a wedge.

17. A packing insert as claimed in claim 9, wherein the wire ring (180) protrudes axially in the A1 direction at at least three points (801, 803, 805, 807) axially in the A2 direction at at least three points (802, 804, 806) and radially outwardly at at least three points (808 to 813), the protrusion being such that the wire touches the outer surface of the anchoring rib (112) at at least nine points.

(References on following page)

References Cited

UNITED STATES PATENTS

| | | |
|---|---|---|
| 1,856,581 | 5/1932 | Mitchell. |
| 1,856,890 | 5/1932 | Stokes. |
| 2,451,070 | 10/1948 | Chamberlain _____ 285—230 X |
| 2,501,943 | 3/1950 | Jack. |
| 2,955,322 | 10/1960 | Hite. |
| 3,064,983 | 11/1962 | Halterman. |
| 3,135,519 | 6/1964 | Ligon et al. |
| 3,150,876 | 9/1964 | Lafferty. |

FOREIGN PATENTS 1,055,460   4/1959   Germany.

LAVERNE D. GEIGER, Primary Examiner

J. S. MEDNICK, Assistant Examiner

U.S. Cl. X.R.

277—207, 255; 285—230, 291, 379